United States Patent Office 3,230,227
Patented Jan. 18, 1966

3,230,227
DIPHENYL AND HYDROXY DIPHENYL ACETO-
HYDROXAMIC ACID ESTERS OF 2-PYRROLI-
DINO AND PIPERIDINO METHANOLS AND
ETHANOLS
Joseph Levy, Paramus, N.J., assignor to Universal Oil
Products Company, Des Plaines, Ill., a corporation of
Delaware
No Drawing. Filed Jan. 6, 1965, Ser. No. 423,831
6 Claims. (Cl. 260—294)

This application is a continuation-in-part of copending application Serial No. 224,236, filed September 17, 1962, now U.S. Patent No. 3,183,255.

This invention relates to new compositions of matter comprising hydroxamate esters. More particularly this invention is concerned with nitrogen containing heterocyclic substituted alkyl esters of diaryl substituted hydroxamic acids, the acid salts and quaternary compounds thereof and to methods for the preparation of said compounds.

It has now been discovered that novel compositions of matter, such as nitrogen containing heterocyclic substituted alkyl esters of diaryl substituted hydroxamic acids and particularly piperidyl or pyrrolidyl substituted alkyl esters of diaryl substituted acetohydroxamic acids, are useful compounds in the medical field, particularly as antispasmodic and anticholinergic drugs.

It is, therefore, an object of this invention to prepare diaryl acetohydroxamate esters which may be utilized as therapeutic agents. A further object of this invention is to prepare piperidyl or pyrrolidyl substituted alkyl esters of diaryl substituted acetohydroxamic acids which may be utilized as therapeutic agents.

The novel compounds of this invention comprise a free base, its addition salts with non-toxic acids, and the lower alkyl quaternary ammonium salts thereof, the free base having the following general formula:

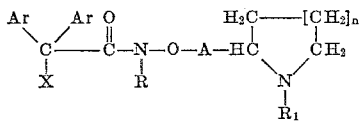

in which Ar is an aromatic radical selected from the group consisting of phenyl, lower alkyl phenyl, halophenyl and lower alkoxyphenyl, X is selected from the group consisting of hydrogen and hydroxy radicals, R is selected from the group consisting of hydrogen and lower alkyl, $R_1$ is lower alkyl, A is alkylene of from 1 to 2 carbon atoms and $n$ is an integer of from 1 to 2. In this specification and appended claims the term lower alkyl is an alkyl group of from one to five carbon atoms.

The free base of the above formula may be conveniently prepared by reacting a diaryl substituted acetohydroxamic acid having the generic formula:

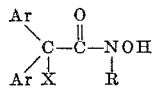

in which the Ar, R and X radicals have the same meaning as above with a piperidyl or pyrrolidyl substituted alkyl halide having the generic formula:

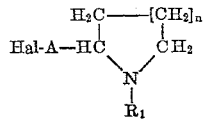

in which the A, and $R_1$ radicals and $n$ have the same meaning as above and Hal is a halogen having an atomic weight of from 35 to 80 (i.e., chlorine or bromine) preferably chlorine, since the chlorine-containing compounds are more readily available, in the presence of an alkaline substance.

Examples of diaryl substituted acetohydroxamic acids which may be used to prepare the compounds of this invention include diphenylacetohydroxamic acid,
di-(p-tolyl) acetohydroxamic acid,
p-methoxydiphenylacetohydroxamic acid,
p-ethoxydiphenylactohydroxamic acid,
p-chlorodiphenylactohydroxamic acid,
p-methyldiphenylacetohydroxamic acid,
p-ethyldiphenylacetohydroxamic acid,
o-methoxydiphenylacetohydroxamic acid,
di-(p-methoxyphenyl) acetohydroxamic acid,
di-p-chlorophenylacetohydroxamic acid,
alpha-hydroxydiphenylacetohydroxamic acid,
alpha-hydroxy-p-methyldiphenylacetohydroxamic acid,
alpha-hydroxy-di-(p-tolyl)acetohydroxamic acid,
alpha-hydroxy-p-chlorodiphenylacetohydroxamic acid,
alpha-hydroxy-p-methoxydiphenylacetohydroxamic acid,
N-methyl-diphenylacetohydroxamic acid,
N-ethyl-alpha-hydroxydiphenylacetohydroxamic acid, or
N-methyl-di-(p-methoxyphenyl) acetohydroxamic acid.

Examples of piperidyl or pyrrolidyl substituted alkyl halides which may be used to prepare the compounds of this invention include 1-methyl-2-piperidylmethyl chloride,
1-ethyl-2-piperidylmethyl bromide,
1-propyl-2-piperidylmethyl chloride,
2-chloro-1-(1-methylpiperidyl-2)ethane,
2-bromo-1-(1-ethylpiperidyl-2)ethane,
2-chloro-1-(1-isopropylpiperidyl-2)ethane,
1-methyl-2-pyrrolidylmethyl chloride,
1-ethyl-2-pyrrolidylmethyl bromide,
2-chloro-1-(1-methylpyrrolidyl-2)ethane,
2-bromo-1-(1-ethylpyrrolidyl-2)ethane or
2-chloro-1-(1-butylpyrrolidyl-2)ethane.

It is, of course, to be understood that the aforementioned compounds are only representatives of the class of compounds which may be used to prepare the compounds of this invention.

One method of preparing the desired compounds of this invention involves the reaction of a diaryl substituted acetohydroxamic acid of the type hereinbefore set forth with a piperidyl or pyrrolidyl substituted alkyl halide also of the type herein set forth in the presence of an alkaline substance. In a preferred method of preparing the compounds of this invention, the diaryl substituted acetohyroxamic acid is treated with the alkaline substance whereby the alkali metal or alkaline earth metal salt of the substitued hydroxamic acid is formed. Following this the piperidyl or pyrrolidyl substituted alkyl halide is added and the reaction allowed to proceed. The reaction may be effected in the presence of water or an alcohol such as methyl alcohol, ethyl alcohol, propyl alcohol, or isopropyl alcohol. Alternatively, the desired compounds of the present invention may be prepared by reacting a previously formed alkali metal or alkaline earth metal salt of a diaryl substituted acetohydroxamic acid with the piperidyl or pyrrolidyl substituted alkyl halide in an anhydrous inert liquid reaction medium such as dimethylformamide, dimethylsulfoxide, tetrahydrofuran, dimethoxyethane, benzene, toluene, xylene, or n-heptane. Alkaline substances which may be utilized to prepare the alkali metal or alkaline earth metal salts include potassium hydroxide, sodium hydroxide, lithium hydroxide, barium hydroxide, sodium methylate, sodium ethylate, sodamide, lithium amide, potassium amide or sodium hydride. About equimolar amounts of the reactants may be used or, if desired, an excess of the piperidyl or pyrrolidyl substituted alkyl halide can be added. The reaction proceeds at room temperatures of about 25° C. although elevated room temperatures up to the reflux temperature of the solvent employed may be used to increase the reaction rate. After the reaction is completed, the product may be isolated by conventional means such as extraction and crystallization or by taking advantage of the relative acidic and basic properties of the materials present to achieve separation and purification.

While the general method of synthesis described hereinabove is satisfactory for the preparation of the compounds of this invention, the compounds are not limited to these preparational methods and any other appropriate synthesis may be utilized. Thus, for example, it appears feasible to prepare the desired products by the reaction of an acid halide of a diarylsubstituted acetic acid with the appropriate hydroxylamine derivative such as the piperidyl or pyrroidyl substituted alkyloxyamine of the general formula:

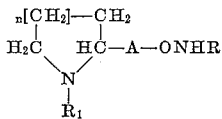

where the terms A, $n$, R and $R_1$ have the same meaning as hereinbefore set forth. When it is desired to have an alpha hydroxy group in the diaryl acetic acid moiety of the compounds prepared according to this procedure, one may start with the acid halide of an alpha-halo or alpha-acetoxy diarylacetic acid and subsequently hydrolyze these groups to hydroxy. This reaction may be carried out in an inert solvent of the type hereinbefore set forth and, if desired, in the presence of a tertiary amine such as pyridine, triethylamine, or tributylamine as an acceptor for the hydrogen chloride liberated.

The non-toxic acid addition salts of the compounds of this invention may be prepared by contacting the corresponding free base with a suitable mineral or organic acid such as hydrochloric, hydrobromic, sulfuric, phosphoric, tartaric, citric, maleic, fumaric, oxalic, succinic, benzoic or hexahydrobenzoic. The quaternary compounds may be readily prepared by reacting the corresponding free base with a lower alkyl halide, sulfate or toluene sulfonate according to well-known procedures. Both the acid addition salts and the alkyl quaternary ammonium salts of the free base may be formulated into suitable pharmaceutical forms such as tablets or capsules for oral administration or solutions for parenteral administration for therapeutic use in animals or humans.

Examples of piperidyl or pyrrolidyl substituted alkyl esters of diaryl substituted hydroxamic acids of this invention include 1-methyl-2-piperidylmethyl diphenylacetohydroxamate,
1-ethyl-2-piperidylmethyl diphenylacetohydroxamate,
1-methyl-2-piperidylmethyl alpha-hydroxy-diphenylacetohydroxamate,
1-ethyl-2-piperidylmethyl di(p-methoxyphenyl)-acetohydroxamate,
2-(1-methylpiperidyl-2)ethyl diphenylaceto-hydroxamate,
2-(1-ethylpiperidyl-2)ethyl alpha-hydroxy-diphenylacetohydroxamate,
2-(1-methylpiperidyl-2)ethyl di-(p-chlorphenyl)-acetohydroxamate,
2-(1-ethylpiperidyl-2)ethyl di-(p-tolyl)-acetohydroxamate,
2-(1-methylpiperidyl-2)ethyl N-methyldiphenyl-acetohydroxamate,
2-(1-methylpiperidyl-2)ethyl N-methyl-alpha hydroxy-diphenylacetohydroxamate,
1-methyl-2-pyrrolidylmethyl diphenyl aceto-hydroxamate,
1-ethyl-2-pyrrolidylmethyldiphenylaceto-hydroxamate,
1-methyl-2-pyrrolidylmethyl alpha-hydroxydiphenyl-acetohydroxamate,
1-ethyl-2-pyrrolidylmethyl p-methoxydiphenyl-acetohydroxamate,
2-(1-methylpyrrolidyl-2)ethyl diphenyl-acetohydroxamate,
2-(1-ethylpyrrolidyl-2)ethyl alpha-hydroxydiphenyl-acetohyroxamate, or
2-(1-methylpyrrolidyl-2)ethyl N-methyl-diphenyl-acetohydroxamate.

The following examples are given to illustrate the compounds and their preparation according to the present invention which, however, are not intended to limit the generally broad scope of the present invention in strict accordance therewith:

*Example I*

2 - (1 - methylpiperidyl-2)ethyl diphenylacetohydroxamate and the oxalic acid salt thereof were prepared according to the following procedure:

About 22.7 grams of diphenylacetohydroxamic acid were added to a solution of 6.6 grams potassium hydroxide in 100 cubic centimeters of ethanol. Partial crystallization of the potassium salt took place. About 16.1 grams of 2-chloro-1-(1-methylpiperidyl-2) ethane were then added and the mixture refluxed for about 6 hours. The precipitated potassium chloride was filtered off and the solvent removed in vacuum to dryness leaving about 39 grams of the crude product as an oil.

About 10 grams of this crude product were dissolved in 50 cubic centimeters of 5 percent sodium hydroxide solution and then treated with about 25 grams of sodium bicarbonate in 350 cubic centimeters of water. The material which separated was then extracted with ether and contacted with oxalic acid in ether to produce the oxalic acid salt. Upon recrystallization of the precipitated salt from ethanol, the quantity of this oxalate salt recovered was about 7 grams. This salt melted at 154°–156° C. The same oxalic acid salt was also obtained directly from the crude reaction product by contacting an ether solution of the crude material with oxalic acid in ether and recrystallizing the precipitated salt from a mixture of ethyl acetate and ethanol.

*Example II*

The methobromide and methiodide quaternary derivatives of 2-(1-methylpiperidyl-2)ethyl diphenylacetohydroxamate were prepared according to the following procedure:

About 5 grams of the free base of Example I was dissolved in 10 milliliters of ether and added to a solution of about 6 grams of methylbromide in 50 milliliters of ether and 10 milliliters of methanol. The mixture was allowed to stand at about 25° C. and a gummy precipitate gradually separated. After about 15 hours the mother liquor was decanted and the gummy product triturated with about 200 milliliters of ether whereupon it solidified. The product was then filtered from the ether and dried in vacuum to recover about 6 grams of a hygroscopic, crystalline solid. This material was completely soluble in water. This solid gradually melted above about 60° C. in a capillary tube. The product was found to contain about the theoretical amount of bromine when analyzed by the Volhard method.

The methyl iodide quarternary salt was prepared in a similar manner employing methyl iodide instead of methyl bromide. The product was also a hygroscopic solid which melted from about 65° to 75° C.

*Example III*

2-(1-methylpiperidyl-2)ethyl N-methyldiphenylactohydroxamate was prepared according to the following procedure:

About 5 grams of the free base of Example I was dissolved in 50 milliliters of ethanol containing about 0.94 gram of potassium hydroxide. About 1.79 grams of dimethyl sulfate were then added to the mixture at about 25° C. Reaction proceeded with formation of a precipitate of potassium sulfate and an increase in temperature to about 29° C. The mixture was then refluxed for about 4 hours after which the precipitate was separated by filtration. The filtrate was then evaporated to dryness to recover about 4.8 grams of a non-crystalline material. This product was insoluble in a 5 percent aqueous sodium hydroxide solution and soluble in aqueous hydrochloric acid, thus indicating that the N-methyl derivative had been produced. The hydrochloric, hydrobromic and oxalic acid addition salts were hygroscopic, gummy materials which could not be crystallized.

*Example IV*

1-methyl-2-pyrrolidylmethyl diphenylacetohydroxamate is prepared according to the general procedure of Example I by the reaction of diphenylacetohydroxamic acid with 1-methyl-2-pyrrolidylmethyl chloride in alcohol solution in the presence of potassium hydroxide.

*Example V*

2 - (1-methylpiperidyl-2)ethyl alpha - hydroxydiphenylacetohydroxamate is prepared according to the general procedure of Example I by the reaction of alpha-hydroxydiphenylacetohydroxamic acid with 1-chloro-2-(1-methylpiperidyl-2)ethane in alcohol solution in the presence of potassium hydroxide.

I claim as my invention:

1. A compound of the class consisting of a free base, its addition salts with non-toxic acids, and the lower alkyl quaternary ammonium salts thereof, said free base having the formula:

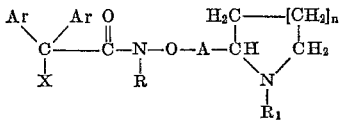

in which Ar is an aromatic radical selected from the group consisting of phenyl, lower alkylphenyl, halophenyl and lower alkoxyphenyl, X is selected from the group consisting of hydrogen and hydroxyl radicals, R is selected from the group consisting of hydrogen and lower alkyl, $R_1$ is lower alkyl, A is alkylene of from 1 to 2 carbon atoms and $n$ is an integer of from 1 to 2.

2. 2-(1-methylpiperidyl-2)ethyl diphenylacetohydroxamate.

3. 2 - (1-methylpiperidyl-2)ethyl N - methyl - diphenylacetohydroxamate.

4. 2-(1-methylpiperidyl-2)ethyl alpha - hydroxydiphenylacetohydroxamate.

5. 2-(1-methylpiperidyl-2)ethyl diphenylacetohydroxamate methobromide.

6. 1 - methyl-2-pyrrolidylmethyl diphenylacetohydroxamate.

No references cited.

NICHOLAS S. RIZZO, *Primary Examiner.*